Jan. 3, 1956　　　T. O. SUMMERS, JR　　　2,729,407
FLIGHT CONTROL SYSTEM
Filed Oct. 15, 1951　　　　　　　　　　　　　6 Sheets-Sheet 2
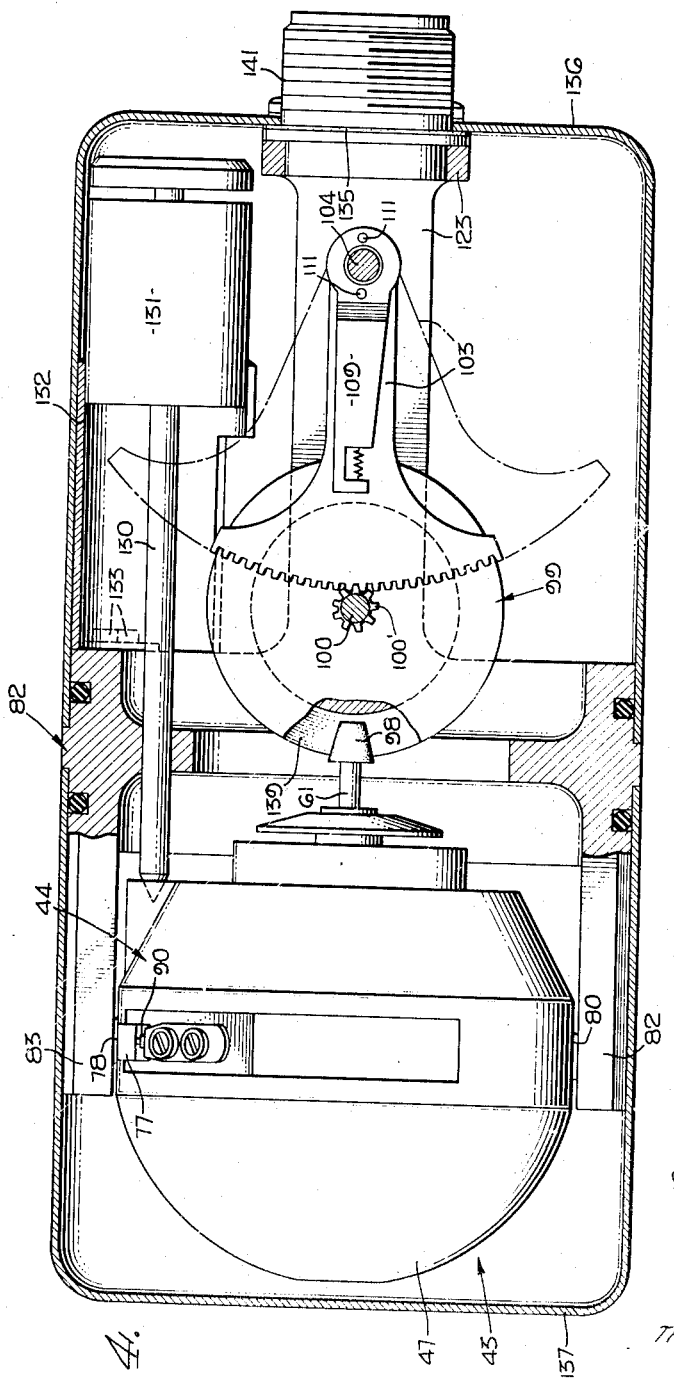
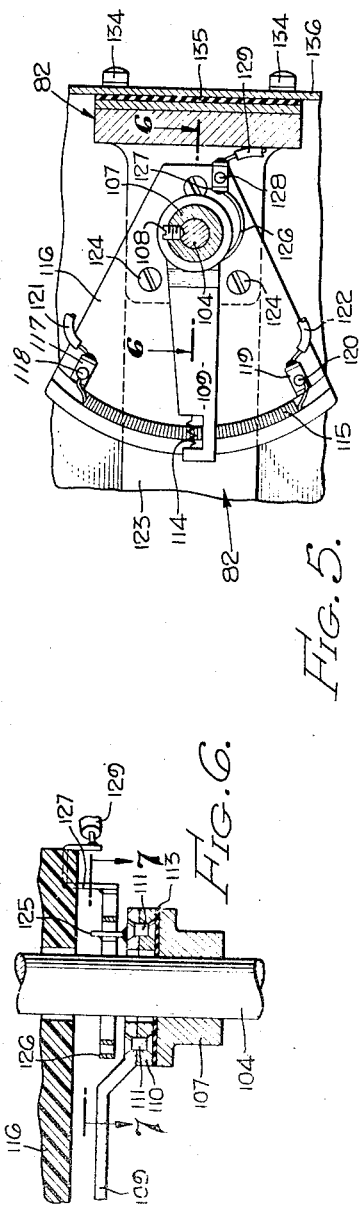
THOMAS O. SUMMERS, JR.
INVENTOR.
BY R. E. Jeangue
ATTORNEY

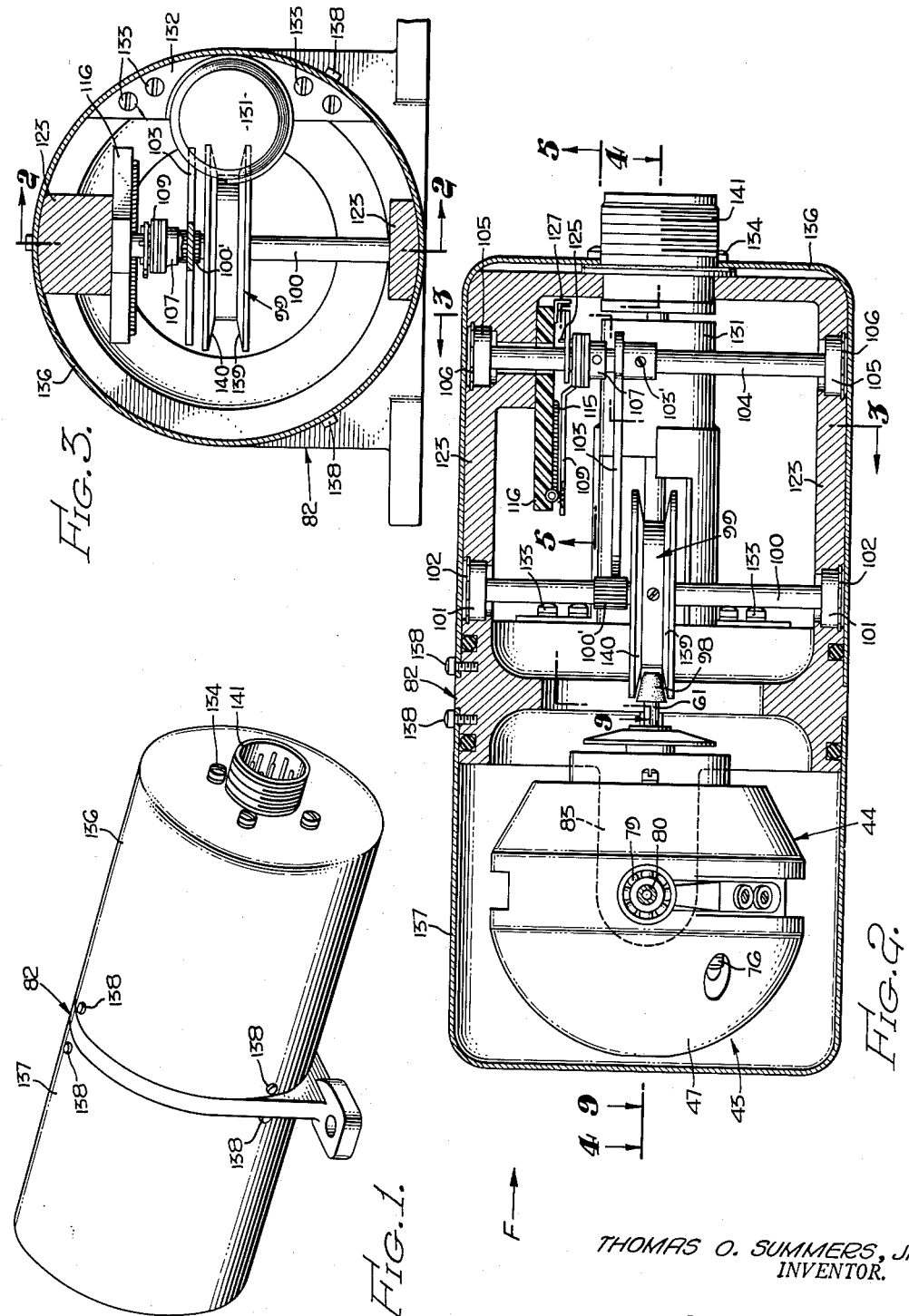

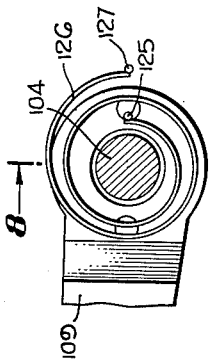
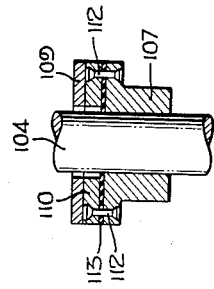
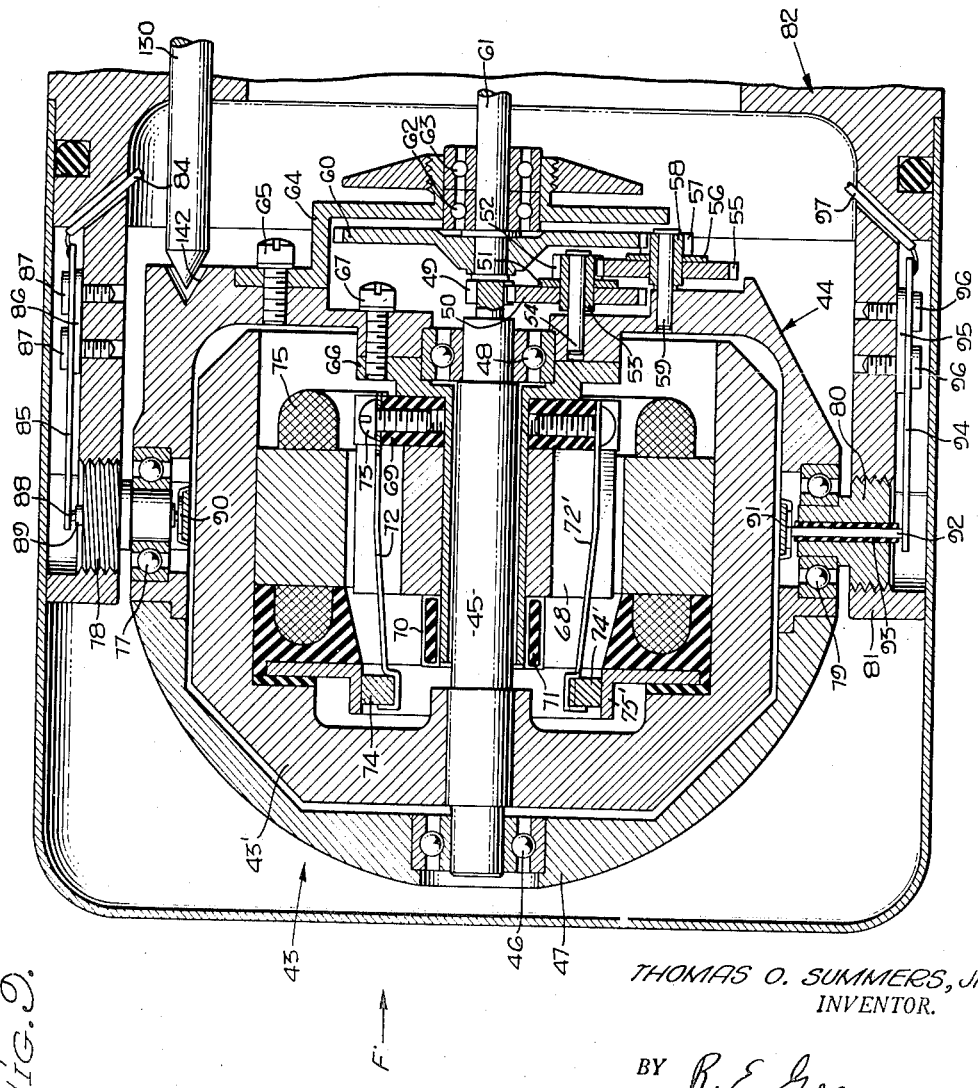

Jan. 3, 1956

T. O. SUMMERS, JR 2,729,407

FLIGHT CONTROL SYSTEM

Filed Oct. 15, 1951

THOMAS O. SUMMERS, JR.
INVENTOR.

BY R. E. Geargue

ATTORNEY

Jan. 3, 1956

T. O. SUMMERS, JR 2,729,407

FLIGHT CONTROL SYSTEM

Filed Oct. 15, 1951

THOMAS O. SUMMERS, JR.
INVENTOR.

BY R. E. Geauque

ATTORNEY

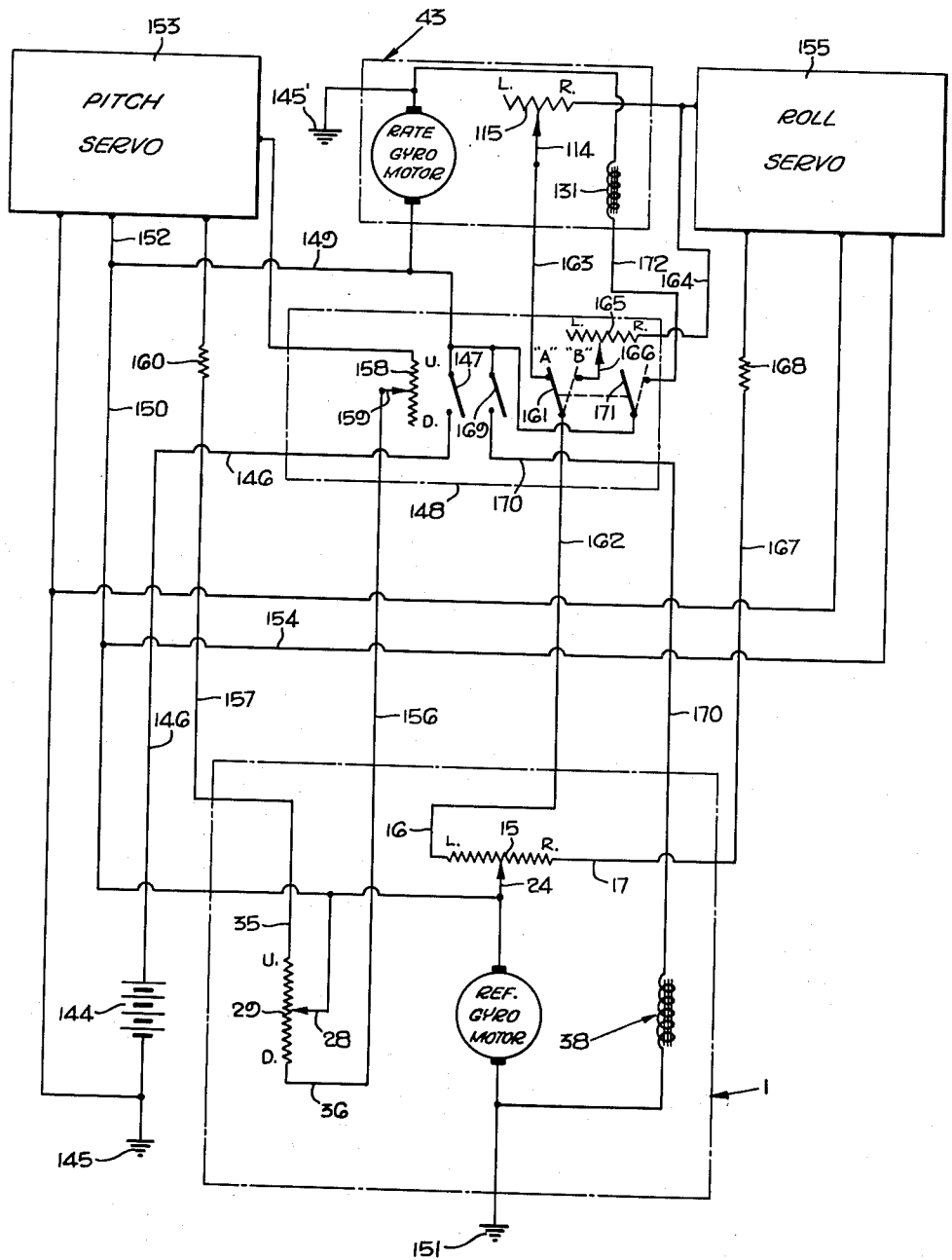

United States Patent Office 2,729,407
Patented Jan. 3, 1956

2,729,407

FLIGHT CONTROL SYSTEM

Thomas O. Summers, Jr., Sherman Oaks, Calif.

Application October 15, 1951, Serial No. 251,422

19 Claims. (Cl. 244—79)

This invention relates to a flight control system for an aircraft in which a rate gyro is utilized to bias the roll reference in order to maintain the aircraft on a substantially straight course.

The utilization of a gyrovertical which is gravity erected in pitch and case erected in roll for controlling the flight of an aircraft is disclosed in U. S. Patent No. 2,635,469 to T. O. Summers, Jr., dated April 21, 1953. In utilizing the gyrovertical of this disclosure, it is first necessary to manually trim the aircraft to a straight course and thereafter the gyrovertical in cooperation with the pickoff on the roll axis will maintain the aircraft on this course. In order to eliminate the requirement of manually setting the aircraft on a straight course, a rate gyro can be utilized in connection with the gyrovertical in the manner disclosed in the application, Serial No. 225,996, filed May 12, 1951 by T. O. Summers, Jr. This rate gyro is utilized to precess the spin axis of the gyrovertical about the roll axis of the aircraft in response to turning of the aircraft and therefore the rate gyro will bring the spin axis to a position where it will provide the proper roll reference for straight flight and eliminate the necessity of manually putting the aircraft on a straight course.

In conventional aircraft, substantially straight flight is obtained when the wings of the craft are level although it is usually necessary to place the ailerons in some position other than streamlined to maintain this straight flight. In the first mentioned application, these ailerons are positioned by manual adjustment of the roll reference so as to place the wings in an approximately level attitude to fly straight. However, when a rate gyro is utilized to eliminate manual control, in the manner described in the second mentioned application, the rate gyro adjusts the roll reference by precessing the gyro spin axis about the roll axis until the roll reference is adjusted to maintain the ailerons in a position to insure an approximately level attitude of the wings corresponding to straight and level flight. By this precession of the spin axes, the spin axis will be displaced from the vertical in order to maintain the ailerons in the required position. This displacement of the spin axis from the true vertical about the roll axis will result in flight error when the aircraft executes a turn such as a 90 degree turn. During such a turn, the spin axis of the gyro vertical will tend to remain fixed in the displaced position and this displacement will show up after the turn as an error in pitch until such time as the spin axis can be gravity erected again about the pitch axis.

In order to eliminate this pitch error, the subject invention utilizes a rate gyro to adjust the roll reference in order to maintain the aircraft on a straight course without precessing the spin axis of the gyrovertical about the roll axis. Also, by the use of this rate gyro, it is not necessary to manually set the aircraft on a straight and level course prior to controlling the aircraft by the gyrovertical. The rate gyro is utilized to adjust a potentiometer placed in the circuit of the roll pickoff and can therefore place sufficient bias in the roll circuit to cause the ailerons to be displaced a sufficient amount for straight and level flight while the spin axis of the gyrovertical remains in the approximate true vertical position due to the fact that it is case erected by the aircraft whose wings are approximately level during this flight. Because of this vertical position of the spin axis, no substantial error in pitch will result when the aircraft executes a turn.

It is therefore an object of this invention to provide a flight control system utilizing a gyrovertical which is gravity erected in pitch and case erected in roll and which has means for maintaining straight and level flight without moving the gyro spin axis from the vertical position about the roll and pitch axis.

Another object of the subject invention is to provide a means for adjusting the roll reference of a gyrovertical to provide a straight flight reference so that the spin axis of the gyrovertical will be maintained in an approximately true vertical position about the roll axis during straight flight.

A still further object of the invention is to provide a flight control system for reducing flight errors resulting from turns of an aircraft which is controlled by a gyrovertical having its spin axis case erected in roll.

Another object of the invention is to provide a novel means of adjusting a potentiometer in response to turning of an aircraft which means includes a rate gyro responsive to turning movement.

These and other objects of this invention not specifically enumerated above wil become readily apparent from the following specification and drawings in which:

Figure 1 is a perspective view of the casing for the rate gyroscope.

Figure 2 is a vertical section of the rate gyroscope along line 2—2 of Figure 3.

Figure 3 is a transverse vertical section of the rate gyroscope along line 3—3 of Figure 2.

Figure 4 is a horizontal section of the rate gyroscope along line 4—4 of Figure 2 showing the friction drive and rate potentiometer quadrant in plan.

Figure 5 is an enlarged partial section taken along line 5—5 of Figure 2 showing the rate potentiometer in plan.

Figure 6 is an enlarged partial section taken along line 6—6 of Figure 5 showing the potentiometer wiper pick-off assembly in elevation.

Figure 7 is an enlarged partial section taken along line 7—7 of Figure 6 showing potentiometer wiper pick-off assembly in plan.

Figure 8 is an enlarged partial section taken along line 8—8 of Figure 7 showing potentiometer wiper and drive shaft assembly detail in elevation.

Figure 9 is an enlarged partial section taken along line 9—9 of Figure 2 showing the gimbal, rotor, and reduction gear system of the rate gyroscope in plan.

Figure 12 is a schematic wiring diagram for utilizing the control signals of the flight control system in order to control flight of the craft.

Figure 10:
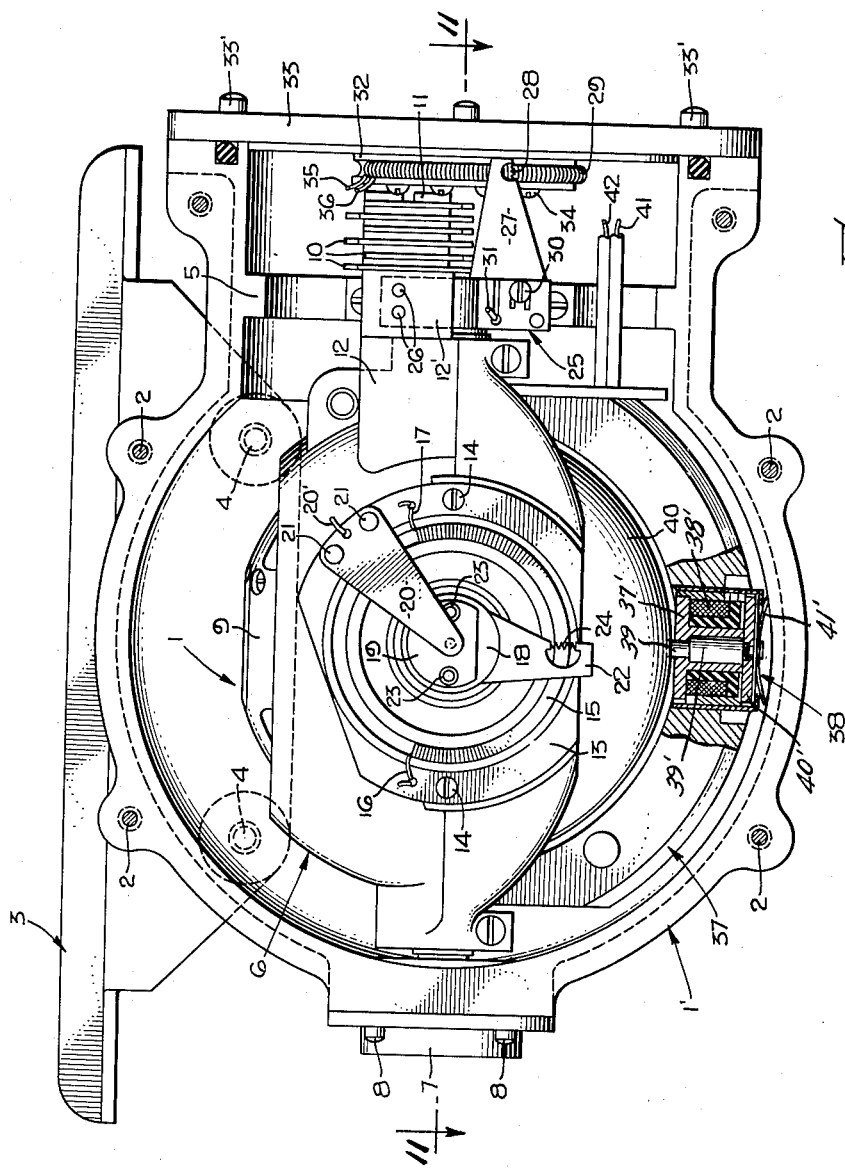
Figure 10 is a front elevational view of the reference gyroscope with the gyro casing removed to illustrate the general arrangement of components.
Figure 11:
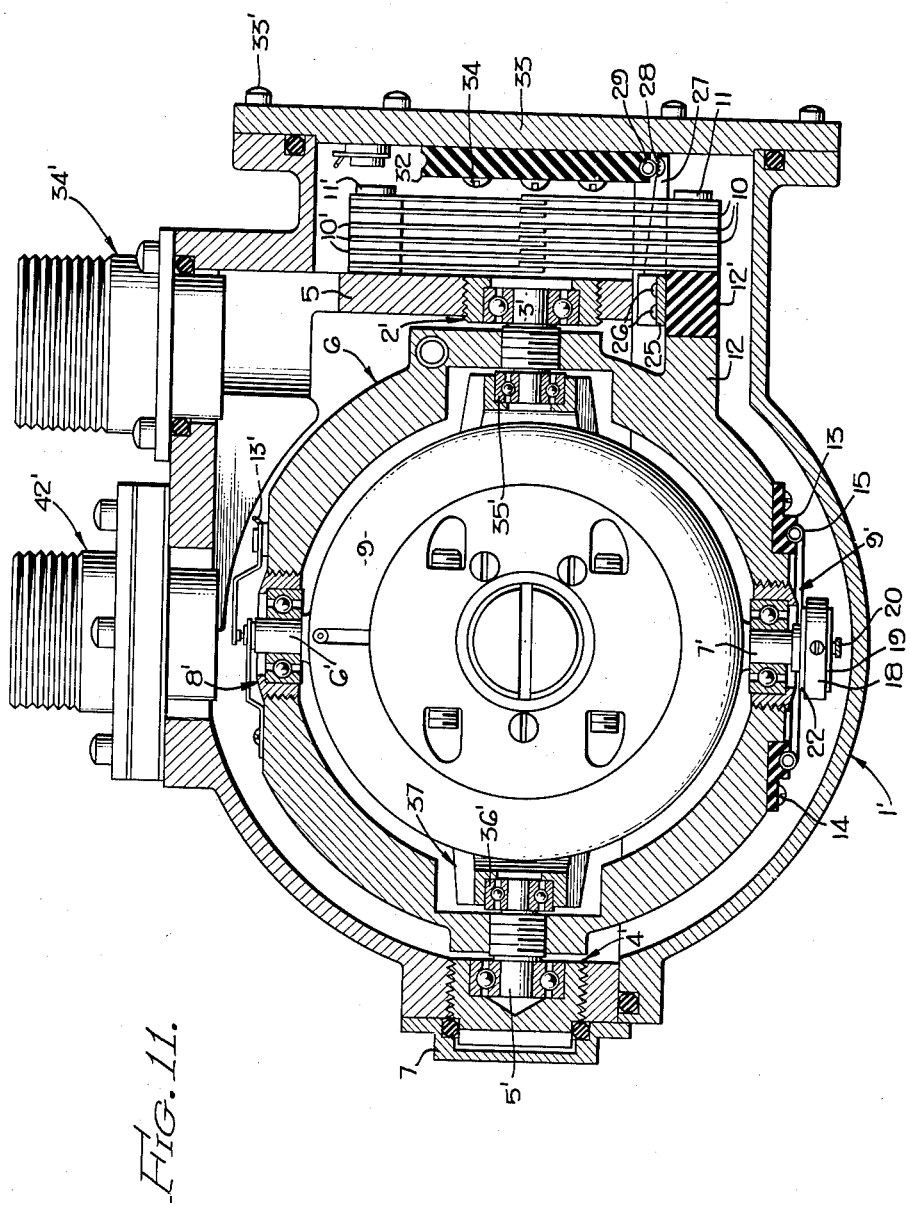
Figure 11 is a horizontal sectional view of the reference gyroscope along line 11—11 of Figure 10, showing the arrangement of the gyroscope gimbals.

The embodiment of the present invention, which has been chosen for illustration and description, comprises a reference gyroscope 1 (see Figures 10 and 11) supported within a divided casing 1' with the casing sections held together by screws 2. A pair of mounting brackets 3 (only one of which is shown) are secured to divided casing 1' by screws 4 and serve to support both the casing and the reference gyroscope within the craft. The direction of travel of the craft is normal to the paper in Figure 10. Projecting into the interior of divided casing 1' is a mounting bracket 5 which carries a bearing assembly 2' for supporting shaft 3' for outer gimbal 6. Cover plate 7 is fastened to divided casing 1' by screws 8 to protect the other outer gimbal bearing assembly 4' supporting outer gimbal shaft 5'. The inner gimbal 9 is supported by shafts 6' and 7' received by inner gimbal bearing assemblies 8' and 9' which are housed in openings in outer gimbal 6. The openings in outer gimbal 6 for supporting the inner gimbal are positioned 90° from the outer gimbal pivotal axis.

A series of six electrical contact plates 10 are secured by means of insulated screws 11 to arm 12 which is integral with outer gimbal 6, and these plates continuously bear against a series of contact plates 10' attached by insulated screws 11' to bracket 5. This system of contact plates provides electrical continuity to the roll potentiometer, pitch potentiometer and the gyro motor. The lead 13' supplies energy to the gyro motor (not shown) through a circuit passing through shaft 6'.

Roll pick-off assembly

An insulated ring 13 is secured by means of screws 14 to the surface of outer gimbal 6 and contains a groove for mounting potentiometer winding 15. Leads 16 and 17 connect the ends of winding 15 to two of the contact plates 10. An insulated disk 18 is retained on the end of the inner gimbal pivotal shaft 7' and mounts a disk 19. A conducting plate 20 is attached to insulated ring 13 by rivets 21 and continually bears against disk 19 which is connected to wiper arm 22 by conducting rivets 23 passing through insulated disk 18. Wiper 24 is attached to wiper arm 22 and is in constant electrical contact with potentiometer winding 15. Lead 20' connects with one of the contact plates 10 and supplies electrical energy to wiper 24 through conducting plate 20 and wiper arm 22. Since the wiper 24 is attached to the inner gimbal 9, rolling movements of the craft will cause the wiper 24 to change positions on potentiometer winding 15 and to thus vary the output through leads 16 and 17.

Pitch pick-off assembly

The arm 12, integral with the outer gimbal 6, carries on an insulated section 12' a bent aluminum strap member 25 by means of rivets 26. A wiper arm 27 is riveted to strap member 25 and contains a wiper 28 which continually bears against potentiometer winding 29. The end of screw 30 is threaded in member 25 and bears against wiper arm 27 so that the pressure of wiper 28 against potentiometer winding 29 can be adjusted. The lead 31 and wiper arm 27 provide electrical continuity between one of the contact plates 10 and the wiper 28. The potentiometer winding 29 is positioned in a groove in the insulated disk 32 which is secured to cover plate 33 by means of screws 34 and cover plate 33 is fastened to divided casing 1' by means of screws 33'. Leads 35 and 36 connect the end of potentiometer winding 29 with a cannon plug 34'. Since wiper 28 is secured to outer gimbal 6, pitching movements of the craft will cause the wiper 28 to change position on potentiometer winding 29 and thus vary the electrical output through leads 35 and 36.

Erecting means

A curved pendulous bail 37 is mounted coaxially with the outer gimbal 6 by bearings 35' and 36' receiving extensions of outer gimbal shafts 3' and 5' respectively. An opening is provided in the bail at 90° to the pivotal axis of the bail in which is mounted a frictional erecting device 38. The frictional erecting device 38 is utilized to erect the reference gyro by bringing its spin axis into line with erector 39. Erecting solenoid 38 is comprised of a core 37' supporting a winding 38' and a plunger 39' is movable within an opening in the core. The erector 39 is carried at one end of the plunger while an armature 40' is secured at the other end in position to be attracted by the field of winding 38'. A spring 41' normally maintains the erector and armature in a position away from rotor dome 40 and permits the erector to be moved into contact with the dome upon energization of winding 38'. When the erecting device 38 is energized through leads 41 and 42 from cannon plug 42', the erector 39 frictionally engages the rotor dome 40 which is secured to and driven by the reference gyro rotor (not shown) and will exert a force on the dome which is at right angles to a line between the spin axis and the erector. This force will cause the gyro to precess and move the spin axis toward the erector with the result that the spin axis is case erected about the roll axis of the aircraft to the normally vertical plane passing through the roll gimbal axis of the gyro and is simultaneously erected in pitch to true gravity vertical. The reference gyro rotor is rotatively mounted within the inner gimbal 9 in any well-known manner and can be driven by a gyro motor of well-known type having the windings carried by the rotor and a field producing means fixed to the inner gimbal. The erecting device 38 can be operated through a manually controlled switch so that the gyro can be caged prior to launching.

Rate gyro

The rate gyro 43 utilized to develop signals in response to turning movements of the aircraft is shown in Figures 1 through 9. The arrow F of Figures 2, 4 and 9 indicates the direction of flight of the craft and the spin axis of the rate gyro rotor 43' normally lies along the fore and aft axis of the aircraft. The gyro rotor 43' is mounted in a gimbal shell 44 and is rotatably supported by shaft 45 which is retained at one end by ball bearing 46 in cap 47, while being retained at the other end in ball bearing 48 in gimbal shell 44. The cap 47 is rigidly attached to gimbal shell 44 by means of screws 76. A pinion 49 is rigidly attached to shaft 45 and engages spur gear 50. Spur gear 50, spacer 51 and pinion 52 are rigidly attached to bushing 53 which rotates on shaft 54 pressed into a hole in gimbal shell 44. Pinion 52 engages spur gear 55 which, along with spacer 56 and pinion 57, is rigidly attached to bushing 58. The bushing 58 rotates on shaft 59 which is pressed into a hole in gimbal shell 44. Pinion 57 engages spur gear 60 which is rigidly attached to friction drive cone shaft 61, supported by ball bearings 62 and 63 mounted in lid 64. The lid 64 is attached to gimbal 44 by means of screws 65. Gears 49, 50, 52, 55, 57 and 60 form a gear reduction whose purpose is to greatly reduce the speed of the shaft 61 to a very low value.

A sleeve 66 is attached to gimbal shell 44 by means of screws 67 and a magnet 68 and brush holder 69 are rigidly attached to sleeve 66 while choke coil 70 is rigidly secured to sleeve 66 through insulator 71. Brush spring 72 is attached to brush holder 69 by screw 73 and spring 72 serves to support brush 74, holding it in continuous contact with commutator 75' of armature assembly 75. In a similar manner, a second brush 74' is held in contact with commutator 75' by means of spring 72' attached to holder 69. The gimbal shell 44 is pivotally mounted at one side by ball bearings 77 and threaded shaft 78 while being pivotally mounted at the other side by ball bearings 79 and threaded shaft 80. An extension 81 of chassis 82 has a threaded hole for retaining threaded shaft 80 and threaded shaft 78 is retained in a threaded hole in extension 83 of chassis 82. Lead 84 is electrically connected to brush spring 85 which is supported by insulator 86 and attached to extension 83 by insulated screws 87. Brush spring 85 maintains constant electrical contact with pin 88 which is carried in an insulated sleeve 89 coaxially mounted in threaded shaft 78. The pin 88 is held in constant electrical contact with plate 90 which forms one terminal of the electrical circuit of the rate gyro motor. Plate 91, which forms the second terminal of the electrical circuit of the gyro motor, maintains constant contact with pin 92 which is carried in an insulated sleeve 93 coaxially mounted in threaded shaft 80. The pin 92 is maintained in constant electrical contact with brush spring 94 which is mounted by insulator 95 and attached to extension 81 by insulated screws 96. A lead 97 connects with brush spring 94 and both leads 84 and 97 terminate in cannon plug 141. The plates 90 and 91 are connected by suitable leads to brushes 74 and 74', respectively, in order to energize the motor through the commutator 75'.

Rigidly attached to the end of friction drive cone shaft 61 is a friction drive cone 98 which normally rests freely between the two conical faces of the friction drive wheel 99. The friction drive wheel 99 is rigidly attached to geared shaft 100 which is mounted in ball bearings 101 located in openings in chassis 82 and retained by snap rings 102. An integral pinion gear 100' on shaft 100 engages a geared sector 103 which is rigidly attached to a shaft 104 by screw 103'. Shaft 104 is mounted in ball bearings 105 contained in openings in chassis 82 and a collar 107 is locked to shaft 104 by means of set screw 108. A wiper arm 109 is rigidly attached to spacer 110 by rivets 111 and spacer 110 is rigidly attached to collar 107 by insulated rivets 112 passing through insulated washer 113 (see Figure 8). A wiper 114, which is electrically and mechanically attached to wiper arm 109, is held in continuous electrical contact with potentiometer winding 115 which is mounted on insulated winding support 116 attached by means of screws 124 to the extension 123 of chassis 82.

The potentiometer winding 115 is electrically attached at one end to post 117, which is firmly mounted on insulated winding support 116 by means of rivet 118, while being electrically attached at the other end to post 119, which is firmly mounted on insulated winding support 116 by rivet 120. Leads 121 and 122 are electrically attached to posts 117 and 119 respectively at one end and terminate in cannon plug 141 at their other ends. A post 125 is rigidly carried by wiper arm 109 and is rigidly attached to one end of conducting spring 126 while the other end of spring 126 is connected to post 127, fixed to insulated winding support 116 by rivet 128. Lead 129 is electrically connected at one end to post 127 while terminating at the other end in cannon plug 141. Thus, the winding 115 and wiper 114 act as a means for dividing electrical energy between leads 121 and 122.

A caging rod 130 is guided at one end in a hole in chassis 82 while being coaxially supported at the other end in solenoid 131, which is firmly attached to a housing 132 rigidly mounted on chassis 82 by means of screws 133. Two leads (not shown) from solenoid 131 terminate in cannon plug 141. The cannon plug 141, which receives all the electrical leads of the rate gyro unit, is firmly mounted on extension 123 of chassis 82 by means of screws 134, which screws also support insulator 135 on cover 136. Two covers 136 and 137 are firmly attached to chassis 82 by means of screws 138 to provide protection for the rate gyro unit.

The rate gyro is so positioned that the gimbal shell 44 will precess about its axis in one direction or another depending upon the direction in which the craft is turning. If the aircraft starts to turn to the right, gimbal shell 44 will pivot on ball bearings 79 and 77 which will bring the rotating friction drive cone 98 into contact with face 139 of friction drive wheel 99 thus causing it to rotate. The angular displacement of rotating friction drive wheel 99 causes a proportional angular displacement of wiper arm 109 since both parts form the ends of a gear train composed of friction drive wheel 99, geared shaft 100, sector 103, shaft 104 and wiper arm 109. If the aircraft starts to turn to the left, gimbal shell 44 will pivot on ball bearings 79 and 77 which will bring the rotating friction drive cone 98 into contact with face 140 of friction drive wheel 99 thus causing it to rotate in a direction opposite to that resulting from a right turn. The angular displacement of rotating friction drive wheel 99 causes a proportional angular displacement of the wiper arm 109 which in turn displaces the wiper 114 on potentiometer winding 115. It is therefore obvious the rate gyro adjusts the potentiometer in response to turning motions of the aircraft.

When solenoid 131 is electrically energized, the conical shaped end of caging rod 130 is forced axially into a conical shaped recess 142 in gimbal shell 44, thus locking the gimbal shell against rotation relative to chassis 82. When gimbal shell 44 is locked, the friction drive cone 98 is positioned midway between faces 139 and 140 of friction drive wheel 99, thus leaving the friction drive cone free to rotate without effect upon the friction drive wheel. It is therefore obvious that when solenoid 131 is electrically energized, the potentiometer of the rate gyro unit becomes insensitive to turning motions of the aircraft and the condition of the potentiometer remains unchanged as long as locking continues.

Electrical control circuit

The reference gyroscope 1 and the rate gyroscope 43 are designated in Figure 12 by dot-dash outlines. A source of electrical energy 144 is grounded at 145 and is connected by line 146 to a master switch 147 on the control panel, which is illustrated by box 148. When switch 147 is closed, electrical energy is supplied through lines 149 and 150 to wipers 28 and 24 and to the reference gyro motor which is grounded at 151. Also, line 149 supplies energy to the rate gyro motor which is grounded at 145'. A branch line 152 from line 150 supplies power to operate the pitch servo 153 while a line 154 supplies power to operate the roll servo 155. The ends of potentiometer winding 29 are connected to the pitch servo 153 through lines 156 and 157. Line 156 contains an adjustable potentiometer which consists of winding 158 and wiper 159 mounted in control panel 148 while the line 157 contains a resistor 160 of one half the value of winding 158.

One end of potentiometer winding 15 is connected by line 162 to a two position switch 161 which is mounted on control panel 148. Switch 161, when in position "A," connects line 162 to roll servo 155 through line 163 which contains a potentiometer consisting of winding 115 and wiper 114. Switch 161, when in position "B," connects line 162 to roll servo 155 through line 164, which contains an adjustable potentiometer consisting of winding 165 and wiper 166 mounted in control panel 148. The other end of potentiometer winding 15 is connected to the roll servo by line 167. Line 167 contains a resistor 168 of one-half the value of potentiometer winding 165 or potentiometer winding 115 which are equal in value.

The servos 153 and 155 can be of the opposed magnetic clutch type wherein each servo has two clutches which co-act with shafts rotating in opposite directions. The resultant output of the two clutches, working against each other, will then be proportional to the difference in current flowing through the two clutches and thus output will operate the control surfaces of the aircraft against the aerodynamic forces which try to streamline them. It is therefore possible to adjust the output of the roll servo in accordance with the differences in currents in lines 162 and 167 and this difference in currents is determined by the positions assumed by wipers 24 and 114 if switch 161 is in position "A" or wipers 24 and 165 if switch 161 is in position "B." Also, the output of the pitch servo 153 is determined by the difference in currents in lines 157 and 156 and this difference is determined by the position assumed by wipers 28 and 159.

A switch 169 on the control panel connects the power line 149 with line 170 which leads to the frictional erecting device 38. When switch 169 is closed, the device 38 is energized with the result that the reference gyro spin axis will be caged. Switch 171 is mechanically connected to and operates in unison with switch 161. When switch 161 is in position "B," switch 171 is closed thus forming a complete circuit from power line 149 to ground 145' through lead 172 and rate gyro caging solenoid 131.

When switch 161 is in position "A," switch 171 is open and there exists no circuit from power line 149 to ground 145' through gyro caging solenoid 131. It is therefore obvious that if switch 161 is in position "A," the rate gyro is uncaged and a circuit is completed from line 162 to the roll servo 155 through the rate gyro 143, and that when switch 161 is in position "B," the rate gyro is caged and a circuit is completed from line 162 to the roll servo 155 through the manually adjustable potentiometer, consisting of winding 165 and wiper 166.

Operation

The operation of the present invention in controlling the flight of an aircraft will now be described. Prior to launching, switch 169 will be closed long enough for erecting device 38 to cage the reference gyro by case erecting the spin axis to the normally vertical plane of the roll gimbal axis and by gravity erecting the spin axis to true gravity vertical about the pitch axis and the switch 169 will remain closed during flight in order to continually erect the reference gyro in the same manner. By erecting the spin axis to the gravity vertical in pitch, it is unnecessary to level the aircraft in pitch prior to launching as is necessary when the craft is equipped with a gyro which is caged to the pitch null position. Also, by case erecting the spin axis about the roll axis prior to launching, the gyro will maintain a roll reference position which will assure substantially straight flight of the craft upon leaving the launcher, even though a rotary launcher is used. If, during launching, the craft has a downward or upward pitch, the wiper 28 will be positioned closer to lead 35 or to lead 36 and unequal currents will flow in lines 156 and 157. This will cause the pitch servo to move the elevators in a direction to level off the craft after leaving the launcher and to position the center of winding 29 in contact with wiper 28. If the wings of the craft are tipped from the horizontal during launching, the wiper 24 will be positioned to one side or the other of winding 15 and the ailerons will be moved to a position which will cause the craft to level off upon leaving the launcher. After the craft has been launched, it will assume an attitude about the pitch axis which is determined by the gravity vertical reference position of the gyro spin axis. Thus, the gravity vertical position of wiper 28 provides a level flight reference for the craft during launching and during the flight of the craft. If it is desired to control the altitude of the aircraft, the pitch of the aircraft can be adjusted to the desired amount by moving the wiper 159 up or down on winding 158. When wiper 159 is moved, unequal currents will flow in lines 156 and 157 and the elevators will be operated in the proper direction to obtain the change in pitch desired. The craft can be leveled off at any time by returning the wiper 159 to its original position.

The rate gyro serves to keep the craft on a straight path during flight. If the craft is in perfect trim about its roll axis, the wiper 24 will normally remain in the center of winding 15 and the craft will fly straight with the ailerons streamlined. Any temporary deviations from straight flight will move the winding 15 relative to wiper 24 and energize the roll servo in a manner to correct the deviation. However, if the craft is out of trim about its roll axis, a condition of unbalanced flow of current in lines 162 and 167 must be maintained in order to hold the ailerons in a position to correct for the out-of-trim condition and maintain straight flight. This is accomplished in the following way. If the craft turns to the right, the rate gyro will sense this turning and will cause wiper 114 to move slowly on winding 115 in a direction which will bring about the necessary unbalance in current flow in lines 162 and 167 to return and hold the craft in straight flight. If the craft turns to the left, the rate gyro will sense this turning and will cause wiper 114 to move on winding 115 in a direction which will bring about the necessary unbalance in current flow in lines 162 and 167 to return and hold the craft in straight flight. When wiper 114 has assumed the correct position on winding 115 to maintain straight flight, the rate gyro will assume a neutral condition and no further movement of the wiper will occur until further straight line flight deviations take place. Momentary deviations from straight flight, which result after the wiper 114 has been positioned for straight flight, will be corrected for by movements of the winding 15 relative to wiper 24 since the rate gyro will not have time to appreciably move the wiper 114 before the deviations are corrected.

In order to purposely turn the craft to the right or left, switch 161 is moved from position "A" to position "B" and wiper 166 is manually moved to the right or the left to thereby adjust the output of roll servo 155 by adjusting the difference in current between lines 162 and 167. When switch 161 is moved from position "A" to position "B," the rate gyro is caged and the relative position of wiper 114 and winding 115 is thereby maintained throughout all turning maneuvers controlled by wiper 166. Thus, when switch 161 is moved from position "B" to position "A" and the rate gyro is automatically uncaged, the wiper 114 and winding 115 are in an optimum relative position for straight line flight.

It is apparent that the present invention provides a simple and reliable means of controlling the flight of an aircraft without the necessity of shifting the spin axis of the reference gyro. It is obvious that the spin axis of the reference gyro could be gravity erected about the roll axis in a conventional manner since gravity erection in roll and case erection in roll are substantially mechanical equivalents. Various other modifications are contemplated and may be readily resorted to by those skilled in the art without departing from the spirit and scope of the invention as hereinafter defined by the appended claims.

What is claimed is:

1. In a flight control system for an aircraft, a reference gyro equipped with pitch and roll references responsive to the position of said gyro, means for simultaneously gravity erecting said reference gyro about the pitch axis of said aircraft and case erecting said reference gyro about the roll axis of said aircraft, means responsive to said pitch and roll references to control the flight of said aircraft and means independent of said reference gyro for adjusting said roll reference of said reference gyro only in response to turning motion of the aircraft so as to maintain said aircraft on a straight course.

2. In a flight control system for an aircraft, a reference gyro having a spin axis and equipped with pitch and roll pickoffs responsive to the position of said spin axis, means for simultaneously gravity erecting said spin axis of said reference gyro about the pitch axis of said aircraft and case erecting said spin axis of said reference gyro about the roll axis of said aircraft and means independent of said reference gyro for adjusting said roll pickoff in response to turning movement only of said aircraft without changing the position of said spin axis.

3. In a flight control system for an aircraft, a reference gyro having a spin axis and pitch and roll pickoffs, said pickoffs being responsive to the position of said spin axis, a pendulous bail pivotally mounted about the pitch axis of said aircraft, a friction erector carried by said bail for gravity erecting said spin axis of said reference gyro in pitch and case erecting said spin axis of said reference gyro in roll, a rate gyro positioned to be responsive to turning only of said aircraft and means operated by said rate gyro to adjust said roll pickoff in response to a turning of said aircraft.

4. A flight control system for normally maintaining an aircraft upon a straight and level course comprising a reference gyro supported by inner and outer gimbals and having roll and pitch potentiometers responsive to the position of said gyro, a pendulous bail pivotally mounted about the pitch axis of said aircraft, a friction erector carried by said bail for continually maintaining the spin axis of said reference gyro in a gravity vertical plane and perpendicular to said pitch axis, means responsive to said potentiometers for controlling the flight of said aircraft, a rate gyro positioned to precess upon turning movements of said aircraft, a friction drive cone carried by said rate gyro and driven by the motor of said rate gyro through reduction gearing, a friction drive wheel having opposed conical faces between which said friction drive cone is positioned so as to contact one or the other of said faces upon precession of said rate gyro in opposite directions, a potentiometer having a wiper arm connected to said drive wheel for movement thereby upon precession of said rate gyro, said last mentioned potentiometer being placed in the circuit of said roll potentiometer so as to adjust said roll potentiometer upon turning movements of said craft in order to maintain said craft on a straight course.

5. In a flight control system for an aircraft, a reference gyro equipped with pitch and roll potentiometers responsive to the position of said reference gyro, means for continually erecting said reference gyro to its flight reference position, a rate gyro positioned to precess upon turning motion of said aircraft, a motor for driving the rotor of said rate gyro, a friction drive cone carried by said rate gyro and driven by said rotor through reduction gearing, a friction drive wheel having opposed conical faces to receive said friction drive cone, said friction drive cone being out of contact with both said faces and centered between said faces during straight flight of said aircraft and being moved into driving contact with one or the other of said faces during turning motion of said aircraft, a potentiometer connected to said friction drive wheel for adjustment by said drive wheel, said last mentioned potentiometer being positioned in the circuit of said roll potentiometer so as to adjust said roll potentiometer upon precession of said rate gyro in response to turning of said aircraft.

6. In a flight control system, a rate gyro positioned to precess in opposite direction upon turning movement, a motor for driving the rotor of said gyro, a drive shaft connected to said rotor through reduction gearing and positioned coaxially with the shaft of said rotor, said drive shaft and reduction gearing being carried by said gyro rotor so as to be moved by precessional movements of said rate gyro, a friction drive member mounted on the end of said drive shaft and positioned between opposed faces of a friction drive wheel, said friction drive wheel being rigidly supported in relation to said gyro rotor so that said friction drive member will drive said friction drive wheel in one direction or the other upon precession of said rate gyro in response to turning motion of said aircraft in one direction or the other.

7. In a control system for a movable craft, a reference gyro equipped with pitch and roll references responsive to the position of said gyro, means for erecting said reference gyro about the pitch and roll axes of said craft to a reference position, means actuated by said pitch and roll references to control the course of said craft, and means for automatically biasing said roll reference only during turning of said craft to adjust the null position thereof to a position corresponding to straight flight of the craft.

8. In a control system for a movable craft, a reference gyro equipped with pitch and roll references responsive to the position of said reference gyro, means for erecting said reference gyro about the pitch and roll axis of said craft to a reference position, means actuated by said pitch and roll references to control the course of said craft, a rate gyro positioned to precess only upon turning of said craft and means operated by said rate gyro upon precession to permanently bias said roll reference in a direction to keep said craft on a straight course.

9. A flight control system comprising a reference gyro equipped with pitch-sensitive and roll-sensitive pickoffs, erecting means for said reference gyro to erect the spin axis of the gyro into a position in roll substantially parallel to the plane of symmetry of the aircraft and to a position in pitch substantially parallel to the vertical line in space, and turn-sensitive means for biasing the null of the roll-sensitive pickoff without changing the spin axis attitude to provide a straight flight roll reference about which the aircraft will fly straight.

10. A flight control system comprising a gyroscope having a spin axis and equipped with at least a roll-sensitive pickoff, erecting means for said gyroscope to erect the spin axis of the gyroscope into a position in roll substantially parallel to the plane of symmetry of the aircraft and turn-sensitive means for biasing the null of said roll-sensitive pickoff upon turning to provide a straight flight roll reference for the craft.

11. A flight control system for a movable craft comprising a gyroscope having a spin axis and a casing supporting at least a roll gimbal, a roll-sensitive pickoff for said gyroscope responsive to the position of said spin axis about the roll gimbal axis, means for erecting said spin axis about the roll gimbal axis to a position fixed with respect to said casing, and a turn-sensitive rate gyro for biasing the null position of said roll pickoff upon precession of said rate gyro to provide a straight course reference.

12. A flight control system as defined in claim 11 having reversible drive means driven in one direction in response to precession of said rate gyro during a turn in one direction and driven in the opposite direction in response to precession of said rate gyro during a turn in the opposite direction and means positioned by said drive means to bias the null position of said pickoff, said drive means being dissociated from said rate gyro while said craft is on a straight course.

13. A flight control system for an aircraft comprising a gyroscope having a spin axis and a casing supporting at least a roll gimbal, a roll-sensitive pickoff for said gyroscope responsive to the position of said spin axis about the roll gimbal axis, means for erecting said spin axis about the roll gimbal axis to a reference position, and turn-sensitive means for permanently biasing said roll pickoff in response to turning of the craft so that said pickoff provides a roll reference about which the aircraft will fly straight.

14. A flight control system as defined in claim 13 wherein said turning-sensitive means includes a turn-sensitive rate gyro, reversible drive means driven in one direction in response to precession of said rate gyro during a turn in one direction and driven in the opposite direction in response to precession of said rate gyro during a turn in the opposite direction and means positioned by said drive means to bias the null position of said pickoff, said drive means being dissociated from said rate gyro while said craft is on a straight course.

15. In a flight control system for an aircraft, a gyro equipped with a roll reference responsive to the position of the gyro about the roll axis of the aircraft, means for case erecting said gyro about the roll axis of said aircraft to a flight reference position and means independent of said gyro and responsive to turning of the aircraft for permanently biasing the roll reference during turning in order to provide a roll reference corresponding to straight flight of the aircraft.

16. In a flight control system for a movable craft equipped with a roll reference, a rate gyro positioned to precess in opposite directions upon turning movement of the mounting craft in opposite directions, reversible drive means driven in one direction in response to precession of said rate gyro during a turn in one direction and driven in the opposite direction in response to precession of said rate gyro during a turn in the opposite direction and means positioned by said drive means for biasing said roll reference to provide a straight course reference, said drive means being dissociated from said rate gyro while said craft is on a straight course.

17. In a flight control system for a movable craft equipped with a roll reference, turn-sensitive means mounted upon said craft and energized upon turning of the craft in opposite directions, reversible drive means responsive to the energization of said turn-sensitive means for movement in opposite directions during turns of the craft in opposite directions and means positioned by said drive means for biasing said roll reference to provide a straight course reference, said drive means being stationary while said craft is not turning and said turn-sensitive means is deenergized.

18. A device for adjusting an aircraft control in response to change in direction of said aircraft, comprising a rate gyro positioned to precess in opposite directions upon movement of the aircraft in opposite directions about one of its axes, reversible drive means movable in one direction in response to precession of said rate gyro during movement of the aircraft in one direction and movable in the opposite direction in response to precession of said rate gyro during movement in the opposite direction and means positioned by said drive means for adjusting said control, said drive means being stationary when said aircraft is not changing direction to cause precession of said rate gyro.

19. A device for adjusting an aircraft control in response to change in direction of said aircraft, comprising direction-sensitive means mounted upon said craft and energized upon movement of the aircraft in opposite directions about one of its axes, reversible drive means responsive to the energization of said direction-sensitive means for movement in opposite directions during movement of the aircraft in opposite directions and means positioned by said drive means for adjusting said control, said direction-sensitive means being inoperative to cause movement of said drive means in either direction when the aircraft is not moving about said one of its axes.

References Cited in the file of this patent

UNITED STATES PATENTS

| | | |
|---|---|---|
| 2,280,116 | Carlson | Apr. 21, 1942 |
| 2,471,821 | Kutzler et al. | May 31, 1949 |
| 2,512,746 | Kliever et al. | June 27, 1950 |
| 2,559,298 | Hayes | July 3, 1951 |
| 2,634,391 | Rusler | Apr. 7, 1953 |
| 2,635,469 | Summers, Jr. | Apr. 21, 1953 |
| 2,635,836 | Summers | Apr. 21, 1953 |